June 2, 1931.　　R. S. SANFORD　　1,808,076
BRAKE OPERATING MECHANISM
Original Filed Feb. 28, 1927
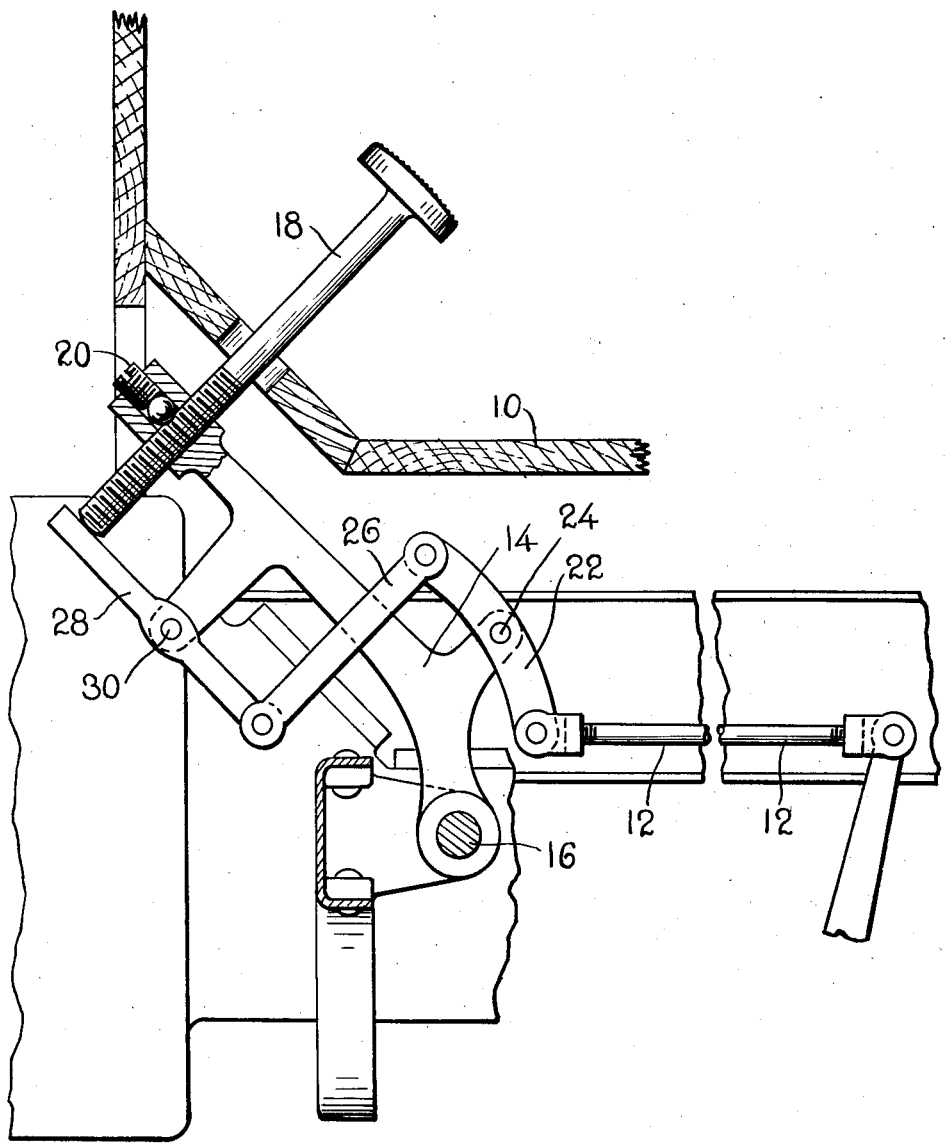
INVENTOR
Roy S. Sanford
BY
Burton & McConkey
ATTORNEYS.

Patented June 2, 1931

1,808,076

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE OPERATING MECHANISM

Original application filed February 28, 1927, Serial No. 171,505. Divided and this application filed February 11, 1928. Serial No. 253,535.

My invention relates to improvements in brake operating mechanism. It is here illustrated as embodied in mechanism of the type generally employed on an automobile.

An object is to provide improved means whereby the brake operating mechanism may be readily adjusted to take care of variations developed therein during use. Brake mechanism of the class specified commonly comprises brake connections disposed below the floor of the vehicle and operating connections extending upwardly through the floor, and my improvement resides in the provision of means operable above the floor to adjust the connections below the floor.

More particularly it resides in the provision of means cooperating with the operating member which extends upwardly through the floor to be actuated thereby to adjustably vary the operating connections and is illustrated in conjunction with pedal mechanism having a part extending through the floor to be actuated thereby, which part cooperates directly with the adjusting means to be actuated to accomplish the adjustment thereof. This application is a division of my application, Serial No. 171,505, filed February 28, 1927.

Other advantages and meritorious features of my invention will more fully appear from the following specification, appended claims and accompanying drawing wherein one illustrative embodiment is shown.

The figure of the drawing is a fragmentary sectional view through an embodiment of my invention.

My invention is disclosed as embodied in brake mechanism for a motor vehicle having a floor 10. An operating lever 14 is supported upon a shaft 16 and a brake operating connection 12 is coupled therewith through a lever 22 pivoted at 24 to the lever 14.

The tread portion of the brake pedal, indicated as 18, is shown as threaded through the lever 14 for adjustment therein. A common form of locking device consisting of a ball and threaded plug 20 is employed to hold the tread at that position at which it may be adjusted with respect to the lever 14. Depression of the tread portion 18 serves to apply the brake mechanism in the usual fashion.

It will be seen that the tread portion 18 extends entirely through the lever 14 and that there is a lever 28 pivoted at 30 to a downward extension of the lever 14 and connected by a link 26 to the lever 22 whereby threaded adjustment of the tread 18 will serve to vary the adjustment of the operating connection with the operating lever 14.

In this construction the brake mechanism is operated in the usual manner and it may be adjusted radially from the interior of the car body through actuation of that portion of the pedal which extends through the floor.

I claim:

1. In brake operating mechanism, a brake pedal provided with an adjustable tread portion, a brake connection adjustably articulated with the pedal, and means actuated by the adjustment of said tread portion for varying the adjustable connection of the brake connection with the brake pedal.

2. Brake operating mechanism comprising a movable brake operating member, a brake connection adjustably coupled therewith to be actuated thereby, a tread portion carried by the member and adjustable thereon to vary the adjustment of the brake operating connection with the member.

3. Brake operating mechanism comprising a brake operating lever pivoted at one end and provided at the opposite end with an adjustable operating portion, a brake connection adjustably coupled with the lever intermediate its ends, and means operable to vary the adjustment of the brake connection through adjustment of the operating portion of the lever.

4. Brake operating mechanism comprising a brake operating lever pivoted at one end and provided at its opposite end with an adjustable tread portion, a brake connection, and means adjustably coupling the brake connection with the lever to be operatively actuated thereby and with the tread portion of the lever to vary its adjustable connection with the lever.

5. Brake operating mechanism comprising a lever pivoted at one end and having a tread portion threaded adjustably through its opposite end, a brake connection, means adjustably coupling the brake connection with the lever to be actuated thereby and with the tread portion to be adjusted thereby with respect to the lever.

6. Brake mechanism for a vehicle having a floor comprising, in combination, operating connections below the floor and a pedal connected therewith having a tread portion extending upwardly through the floor and operable thereabove to actuate the brake connections below the floor, said tread portion being adjustable with respect to the pedal proper adjustable to vary the connection of the brake connections therewith.

7. Brake mechanism for a vehicle having a floor comprising, in combination, operating connections below the floor and a pedal having a portion extending upwardly through the floor which is directly depressible to apply the brake operating connections and adjustably depressible to vary the adjustment thereof.

8. Brake operating mechanism for a vehicle having a floor comprising, in combination, an operating member having a tread portion extending upwardly through the floor, a brake operating connection coupled to said member to be operatively actuated thereby, and means cooperative with the tread portion of said operating member to be actuated thereby to vary the adjustment of the coupling between the connection and the operating member.

9. Brake operating mechanism for a vehicle having a floor comprising, in combination, an operating member having a tread portion extending upwardly through the floor, an operating connection, and means linking the operating connection with the operating member to be actuated thereby including a part cooperating directly with the tread portion of the operating member that extends upwardly through the floor to be actuated thereby upon rotation of said tread portion to vary the adjustment of the operating connection with the operating member.

10. Brake operating mechanism comprising, in combination, a brake operating lever pivoted at one end, a tread member adjustably threaded through its opposite end, a brake operating connection, linkage carried by said lever coupling the brake operating connection with the lever to be operatively actuated thereby and coupling the brake operating connection with the tread member to be adjusted thereby to vary its connection with the lever.

11. Brake operating mechanism comprising, in combination, a brake operating lever pivoted at one end and provided at its opposite end with a tread member adjustable with respect thereto, a brake operating connection, linkage including a pair of levers each pivoted to the brake operating lever, one of said pair of levers connected with the brake operating connection and the other of said pair of levers connected with the tread member, said pair of levers being interconnected whereby adjustment of the tread member actuates the pair of levers to vary the connection of the brake operating connection with the brake operating lever.

In testimony whereof I, ROY S. SANFORD, sign this specification.

ROY S. SANFORD.